ELECTRONIC PULSE CODER
Filed Nov. 14, 1952
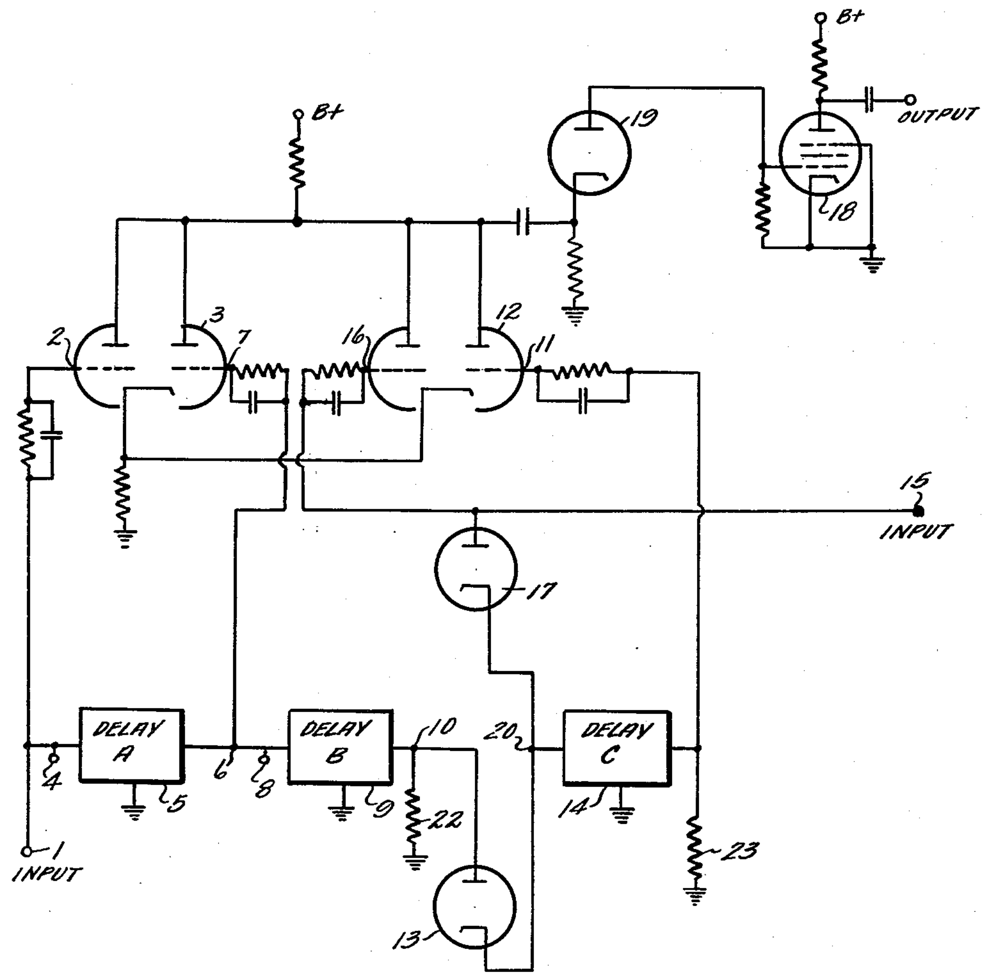
INVENTOR.
JOHN G. LEMING
BY Theodore C. Wood
AGENT
Wade Koontz
ATTORNEY United States Patent Office 3,014,180

Patented Dec. 19, 1961

3,014,180

ELECTRONIC PULSE CODER

John G. Leming, Niagara Falls, N.Y., assignor to the United States of America as represented by the Secretary of the Air Force Filed Nov. 14, 1952, Ser. No. 320,511
1 Claim. (Cl. 328—38)

This invention relates to pulse coding circuits and more particularly to that type of pulse coding circuit wherein a signal applied to one input of the circuit will produce three pulses in the output, and when a signal is applied to another input of the circuit two signals will appear in the output.

In copending U.S. patent application Serial Number 320,506, filed November 14, 1952, now Patent No. 2,978,-695, by Jenus Lamar Dunn and entitled "Electronic Pulse Coder," there is disclosed electronic pulse coding circuits wherein a single signal when applied to one input produces three signals spaced in time in the output circuits, and when the signal is applied to another input of the circuit two signals spaced in time appear in the output. However, since the spacing in time of the pulses is uniform, such systems do not lend themselves to maximum secrecy.

It is an object of this invention to provide an electronic pulse coding circuit of the class described wherein the spacing between the pulses may be made nonuniform and further may be made to have any particular value desired thus providing for secrecy coding.

The above object, as well as other objects, features and advantages of this invention will be more readily understood in view of the following description when taken in conjunction with the drawing, wherein the single FIGURE illustrates in simplified schematic diagram form a pulse coding circuit constructed in accordance with the principles of this invention.

Referring now to the drawing, a first source of input pulses has its output applied to terminal 1, which signal is then applied to the control grid 2 of tube 3, and is also applied to terminal 4 of delay line 5. Terminal 6 of delay line 5 applies that delayed pulse to control grid 7 of tube 3, and also applies the pulse to terminal 8 of delay line 9, whose output terminal 10 applies the delayed pulse to control grid 11 of tube 12 through rectifier 13 and delay line 14. A second source of input pulses has its output connected to terminal 15 which applies those pulses to control grid 16 of tube 12, and also applies those pulses to the control grid 11 of tube 12 through the rectifier 17 and the delay line 14. Tubes 3 and 12 have a common anode-cathode circuit, and the output of that circuit is applied to the control grid of tube 18 through a positive pulse blocking circuit including the rectifier 19.

Assume a positive pulse applied to terminal 1. That positive pulse appears on grid 2 of tube 3 and produces a negative pulse in the output circuit of tubes 3 and 12. The pulse from input 1 also is applied to delay line 5, and after a predetermined time, dependent upon the delay characteristics of delay line 5, that positive pulse will appear on grid 7 of tube 3, and will produce a second negative pulse in the output circuit of tubes 3 and 12. That positive pulse at the output terminal 6 of delay line 5 is also applied to input terminal 8 of delay line 9, and after a predetermined time will appear at terminal 10 of delay line 9, and due to the fact that rectifier 13 is poled in the manner shown in the drawing that pulse will be applied to the input of delay line 14 and a predetermined time thereafter will appear on grid 11 of tube 12 which will produce a third negative pulse in the output circuit of tubes 3 and 12. It should be noted that since rectifier 17 is poled in the manner shown in the drawing, pulses from terminal 10 of delay line 9 which appear at terminal 20 of delay line 14 will not appear on grid 16 of tube 12 and will therefore not produce any signal in the output of tubes 3 and 12. It will be further noted that the time spacing between the first and second negative pulses in the output circuit of tubes 3 and 12 will be dependent upon the delay characteristics of delay line 5. However, the time spacing between the second and third negative pulses in the output circuit of tubes 3 and 12 will be dependent upon the delay characteristics of delay line 9 and delay line 14.

Assume a single positive pulse is applied to input terminal 15. That positive pulse is applied to grid 16 of tube 12 and will produce a first negative pulse in the output circuit of tubes 3 and 12, and since rectifier 17 is poled in the manner shown in the drawing that positive pulse will be applied to the input terminal 20 of delay line 14 and a predetermined time thereafter, dependent upon the delay characteristics of delay line 14, that pulse will appear on grid 11 of tube 12 which will result in a second negative pulse in the output circuit of tubes 3 and 12. It should be noted that due to the fact that rectifier 13 is poled in the manner shown in the drawing the positive pulse applied to terminal 15 which will appear at input terminal 20 of delay line 14 will not be conducted to the delay line 9, and therefore will not appear on grids 2 and 7 of tube 3.

If cascaded delay lines 5, 9 and 14 have equal characteristic impedances and resistance 23 is made equal thereto, no reflections of pulses will occur in these lines. Resistance 22 is used to compensate for the added impedance of diode 13 which would otherwise cause the termination of line 9 to be slightly above its characteristic impedance.

From the above description it will be apparent that the amount of delay between the first and second pulses of the three pulse code will be dependent upon the delay characteristic of delay line 5; the amount of delay between the second and third pulse of the three pulse code will be dependent upon the delay characteristics of delay lines 9 and 14 and the amount of delay between the first and second pulses of the two pulse code will be dependent upon the delay characteristics of delay line 14. Due to this circuit arrangement, the amount of delay between the pulses of the codes may be made to be nonuniform and may also be made to have any desired value.

Although a particular preferred embodiment of this invention has been illustrated and described, that illustration and description is merely for the purpose of more clearly explaining the principles of this invention and are not to be construed as limiting, since many additions, omissions and modifications may be made without departing from the scope of this invention.

What is claimed is:

An electronic pulse coder comprising first, second, third and fourth electron discharge devices having a common output circuit and each having an input circuit; a first source of pulses; a second source of pulses; first, second and third pulse delay lines each having input and output terminals; means coupling said first source of pulses to the input terminals of said first delay line and to the input circuit of said first electron discharge device; means coupling the output terminals of said first delay line to the input terminals of said second delay line and to the input circuit of said second electron discharge device; means coupling said second source of pulses to the input circuit of said third electron discharge device; a first unidirectional coupling between the output terminals of said second delay line and the input terminals of said third delay line; a second unidirectional coupling between said second source of pulses and the input terminals of said third delay line; said first unidirectional coupling operating to pass pulses derived from said first source of pulses from the output terminals of said second delay line to the input terminals of said third delay line and to block the passage of pulses of said second source in the opposite direction; said second unidirectional coupling operating to apply pulses of said second source to the input terminals of said third delay line and to block the passage of pulses of said first source from the input terminals of said third line to the input circuit of said third electron discharge device; and means coupling the output terminals of said third delay line to the input circuit of said fourth electron discharge device.

References Cited in the file of this patent

UNITED STATES PATENTS

| | | |
|---|---|---|
| 2,266,154 | Blumlein | Dec. 16, 1941 |
| 2,474,243 | Greenwald | June 28, 1949 |
| 2,579,497 | Isbister | Dec. 21, 1951 |